US008179262B2

(12) United States Patent
Ichikawa et al.

(10) Patent No.: US 8,179,262 B2
(45) Date of Patent: May 15, 2012

(54) ARTICLE MANAGEMENT SYSTEM, RFID TAG, AND APPARATUS FOR COMMUNICATING WITH RFID TAG

(75) Inventors: Yasuhisa Ichikawa, Nagoya (JP);
Takuya Nagai, Nagoya (JP); Shiro Yamada, Kasugai (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 428 days.

(21) Appl. No.: 12/455,924

(22) Filed: Jun. 9, 2009

(65) Prior Publication Data

US 2009/0251319 A1    Oct. 8, 2009

Related U.S. Application Data

(63) Continuation-in-part of application No. PCT/JP2007/073762, filed on Dec. 10, 2007.

(30) Foreign Application Priority Data

Dec. 11, 2006  (JP) ................................. 2006-333734

(51) Int. Cl.
*G08B 13/14* (2006.01)
(52) U.S. Cl. ................ 340/572.4; 340/572.1; 340/568.1; 340/539.13
(58) Field of Classification Search ............... 340/572.1, 340/572.4, 572.7, 571, 568.1, 568.5, 568.8, 340/539.11, 539.13, 10.1; 235/383, 384, 235/385; 463/25, 42
See application file for complete search history.

(56) References Cited

U.S. PATENT DOCUMENTS

| | | | | |
|---|---|---|---|---|
| 5,959,568 A * | 9/1999 | Woolley | .......................... | 342/42 |
| 7,495,561 B2 * | 2/2009 | Bodin et al. | ................ | 340/572.1 |
| 7,518,511 B1 * | 4/2009 | Panja et al. | ................ | 340/572.1 |
| 7,659,821 B2 * | 2/2010 | Kim et al. | ................ | 340/572.1 |
| 7,853,477 B2 * | 12/2010 | O'Shea et al. | ................ | 705/14.1 |
| 7,857,221 B2 * | 12/2010 | Kuhno et al. | ................ | 235/462.1 |
| 2004/0259545 A1 * | 12/2004 | Morita | ........................ | 455/435.1 |
| 2006/0290493 A1 | 12/2006 | Taki | | |
| 2007/0103301 A1 * | 5/2007 | Bowman et al. | ............ | 340/572.1 |

FOREIGN PATENT DOCUMENTS

| | | |
|---|---|---|
| JP | 3036199 A | 2/1991 |
| JP | 2002092114 A | 3/2002 |
| JP | 2003524242 T | 8/2003 |
| JP | 2005008346 | 1/2005 |
| JP | 2005182352 A | 7/2005 |
| JP | 2005215959 A | 8/2005 |
| JP | 2006076758 A | 3/2006 |
| JP | 2006116666 A | 5/2006 |
| JP | 2006176297 A | 7/2006 |
| WO | WO 01/57807 A1 | 8/2001 |

* cited by examiner

*Primary Examiner* — Van T. Trieu
(74) *Attorney, Agent, or Firm* — Day Pitney LLP

(57) ABSTRACT

An article management system includes a plurality of radio frequency identification (RFID) circuit elements respectively handled in association with articles to be managed; and an apparatus for communicating with an RFID tag, each of the RFID tag circuit elements having an IC circuit part storing tag identification information, own target information, and management position information, and the apparatus having a communicating device; a position-information obtainment portion configured to obtain the management position information; and a position-information display output portion configured to output a signal for displaying the management position information.

9 Claims, 12 Drawing Sheets

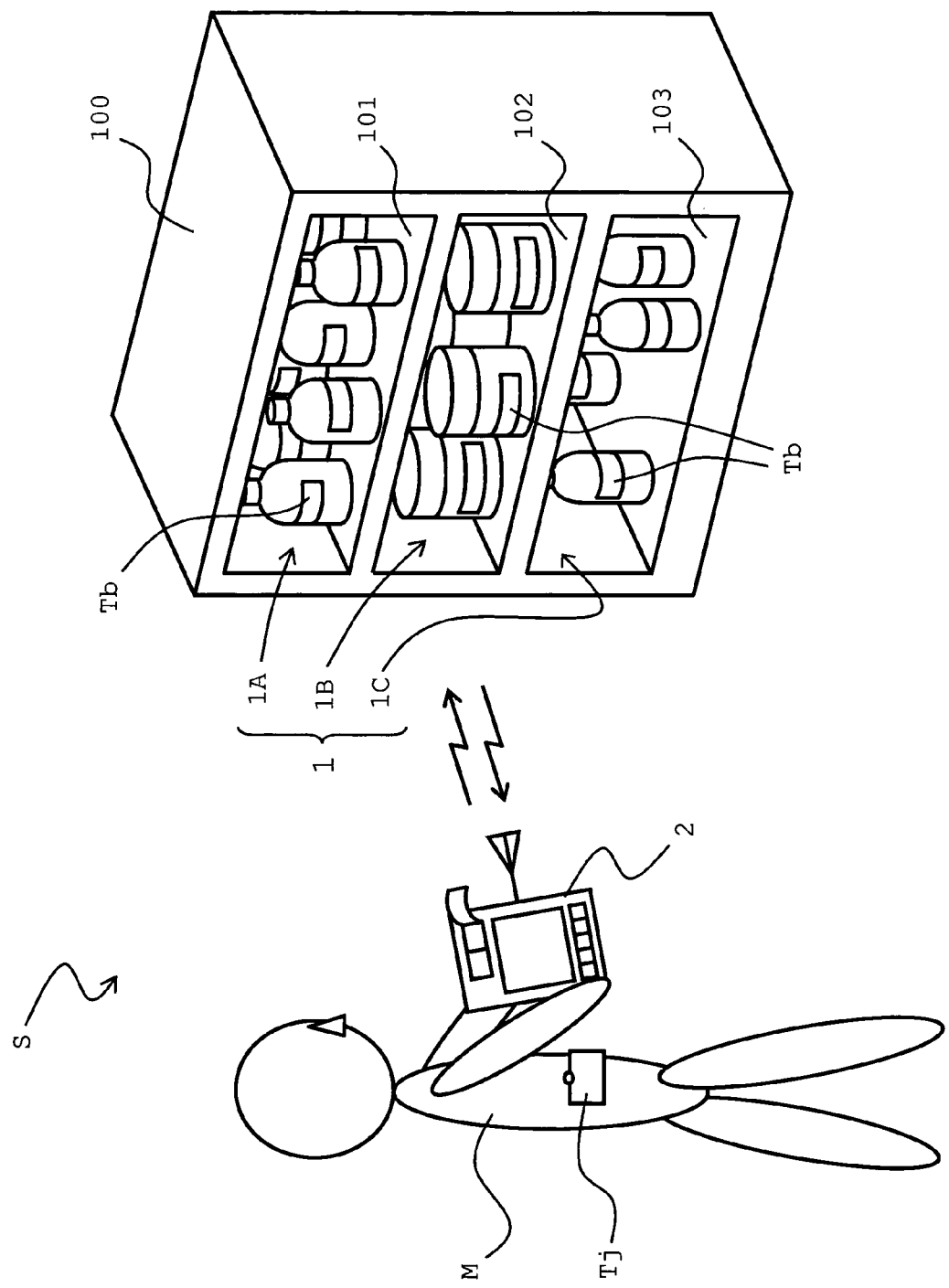
[FIG. 1]

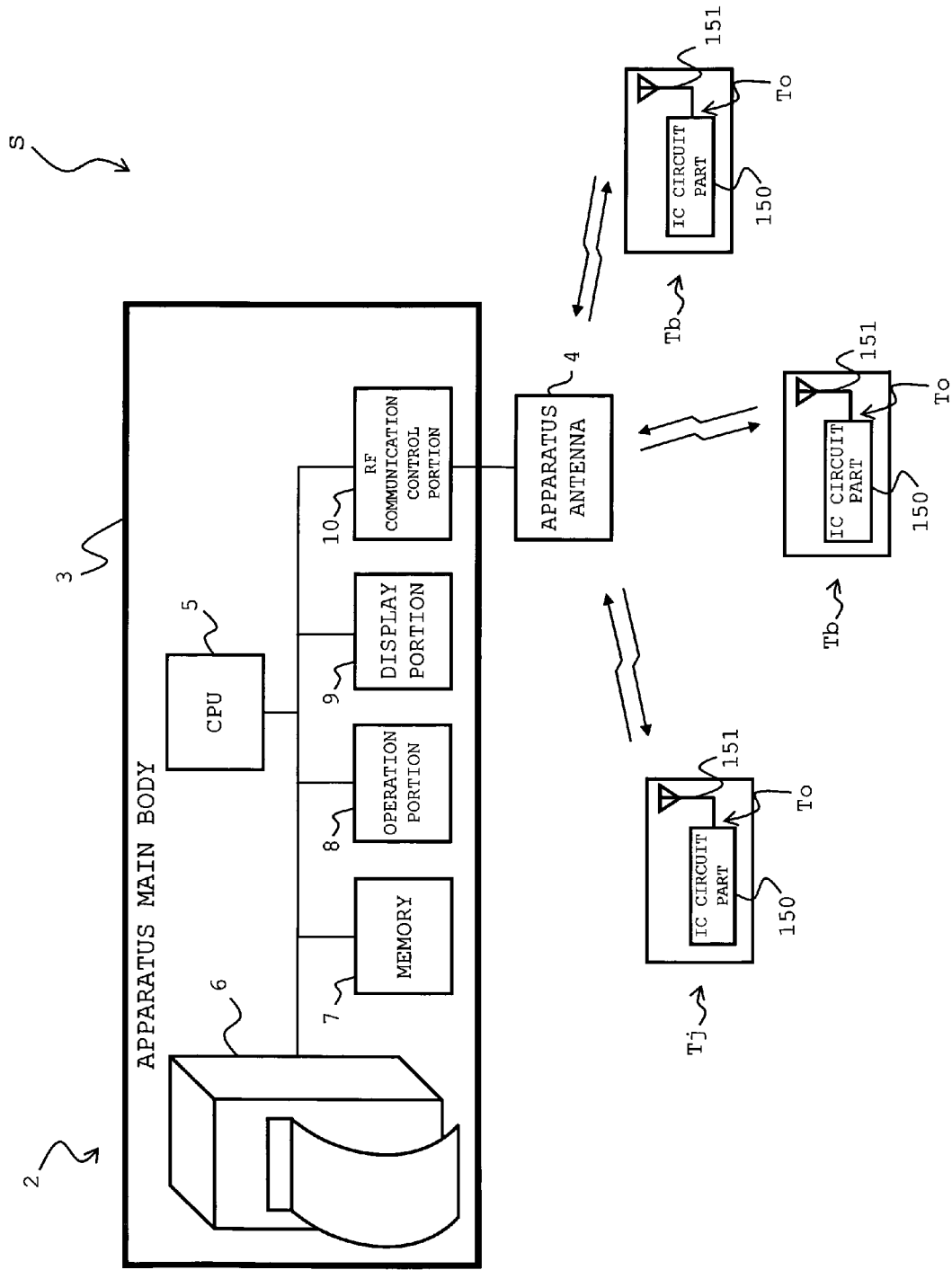
[FIG. 2]

[FIG. 3]
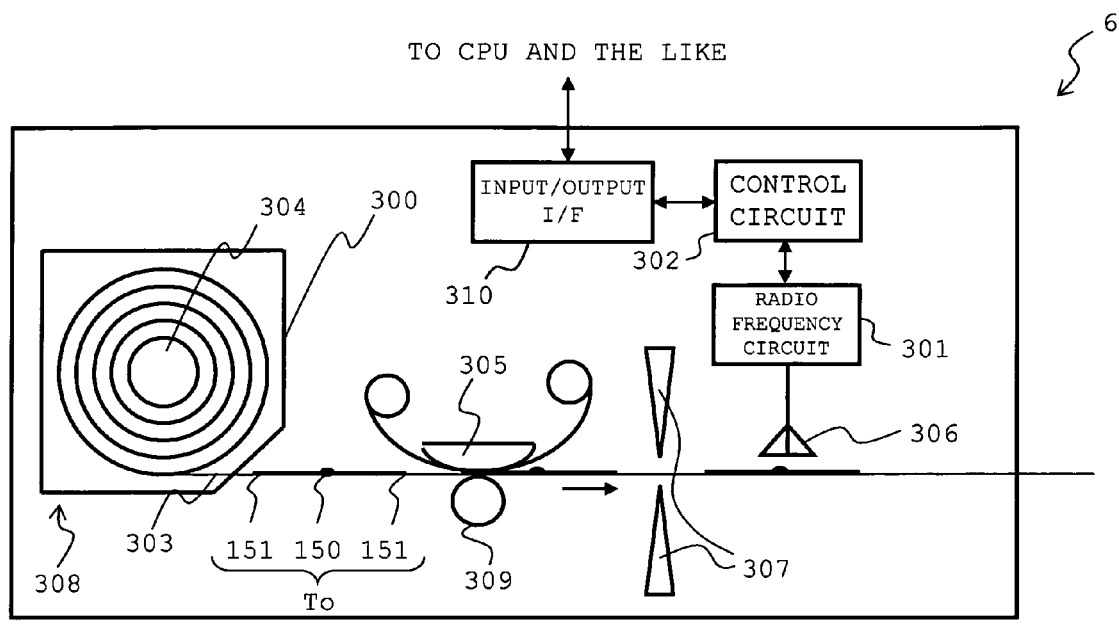

[FIG. 4A]
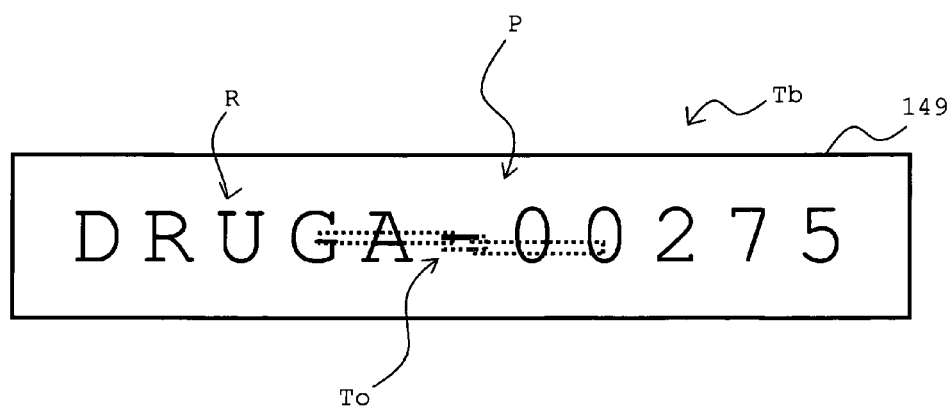
[FIG. 4B]
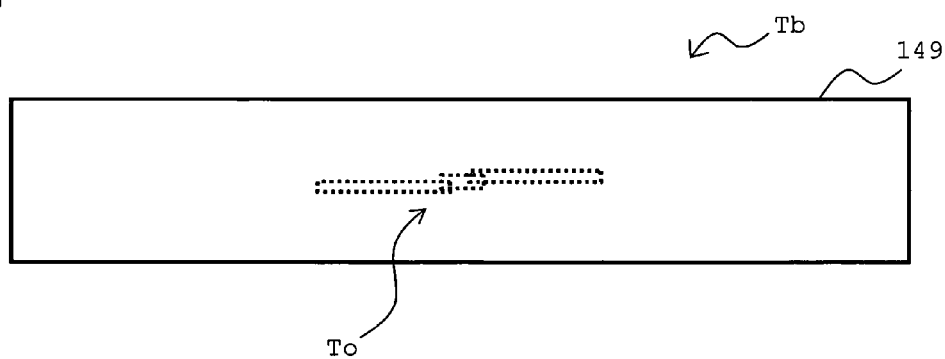

[FIG. 5]

RFID TAG INFORMATION

| | |
|---|---|
| NON-REWRITABLE OWN INFORMATION | ARTICLE TAG ID |
| | OWN TYPE CODE |
| | OWN SERIAL NUMBER |
| | OWN MANUFACTURING DATE |
| | OWN EXPIRY DATE |
| | OWN TYPE MANAGEMENT POSITION |
| REWRITABLE OWN INFORMATION | OWN TYPE UPDATE DATE |
| | OWN TYPE STOCK QUANTITY |
| | OWN STATUS FLAG |
| | OWN USER ID |
| | OWN USER NAME |
| NON-REWRITEABLE NEIGHBOR INFORMATION | NEIGHBOR TYPE CODE |
| | NEIGHBOR TYPE MANAGEMENT POSITION |
| | NEIGHBOR TYPE COMPATIBILITY FLAG |
| REWRITABLE NEIGHBOR INFORMATION | NEIGHBOR TYPE UPDATED DATE AND TIME |
| | NEIGHBOR TYPE STOCK QUANTITY |
| | NEIGHBOR STATUS TABLE |

[FIG. 6]

NEIGHBOR STATUS TABLE

| NEIGHBOR SERIAL NUMBER | NEIGHBOR STATUS FLAG | NEIGHBOR USER ID | NEIGHBOR USER NAME |
|---|---|---|---|
| 00328 | 1 (HAVING BEEN TAKEN OUT) | 8000A2 | SATOH |
| 00329 | 0 (IN STORAGE) | — | — |
| 00330 | 2 (RESERVED) | 80001C | TANAKA |
| ... | | ... | ... |

[FIG. 7]
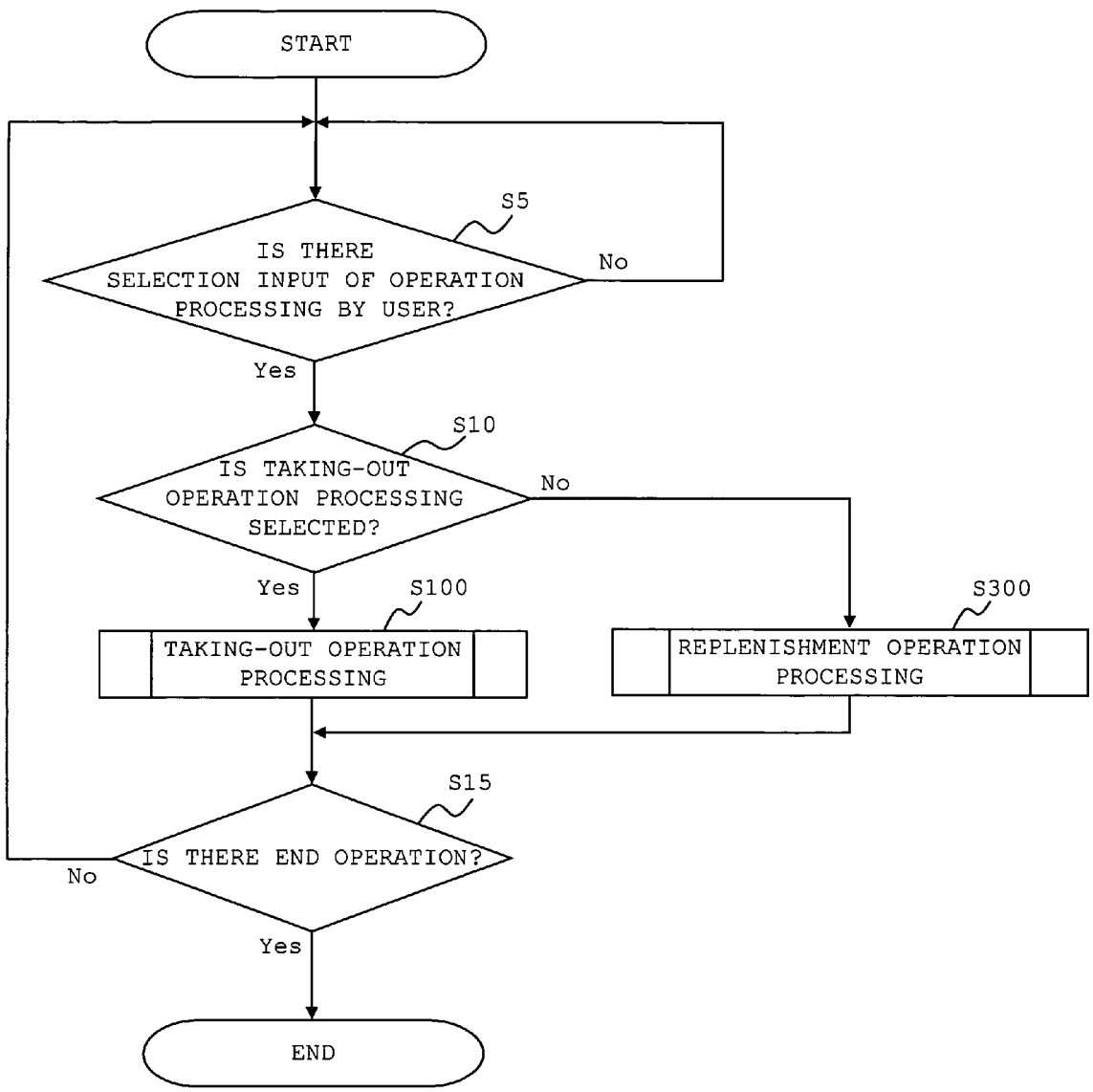

[FIG. 8]
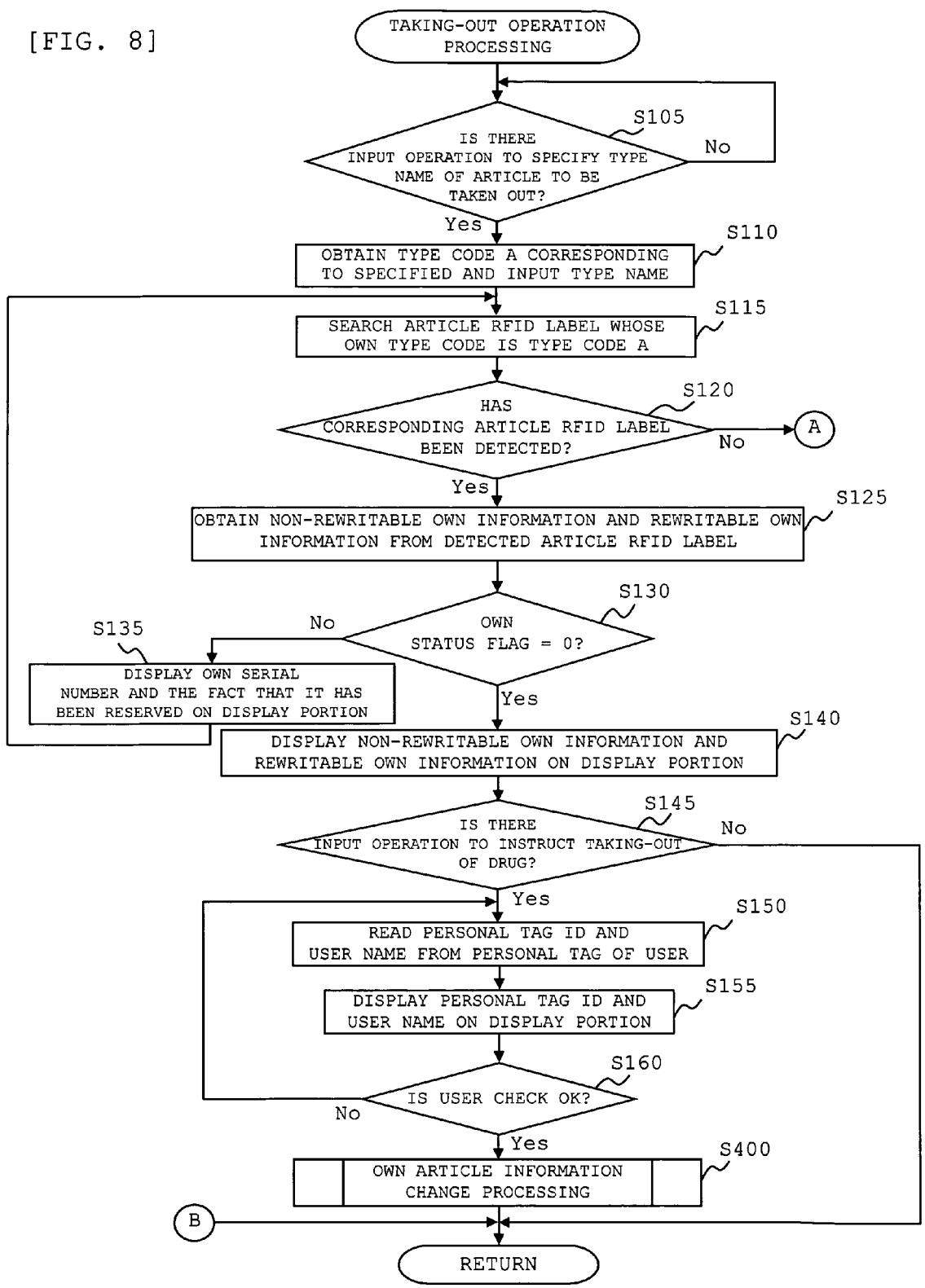

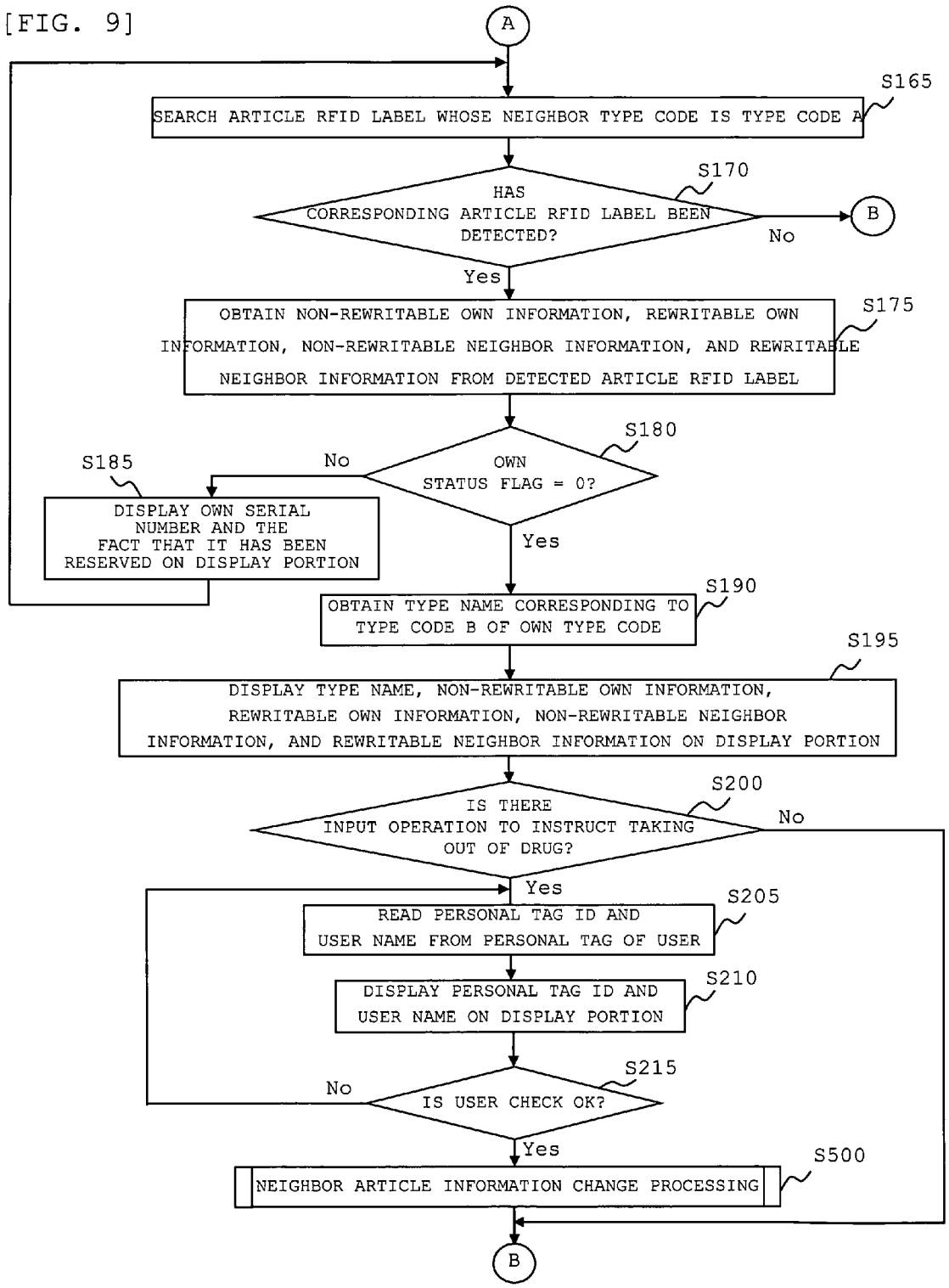
[FIG. 9]

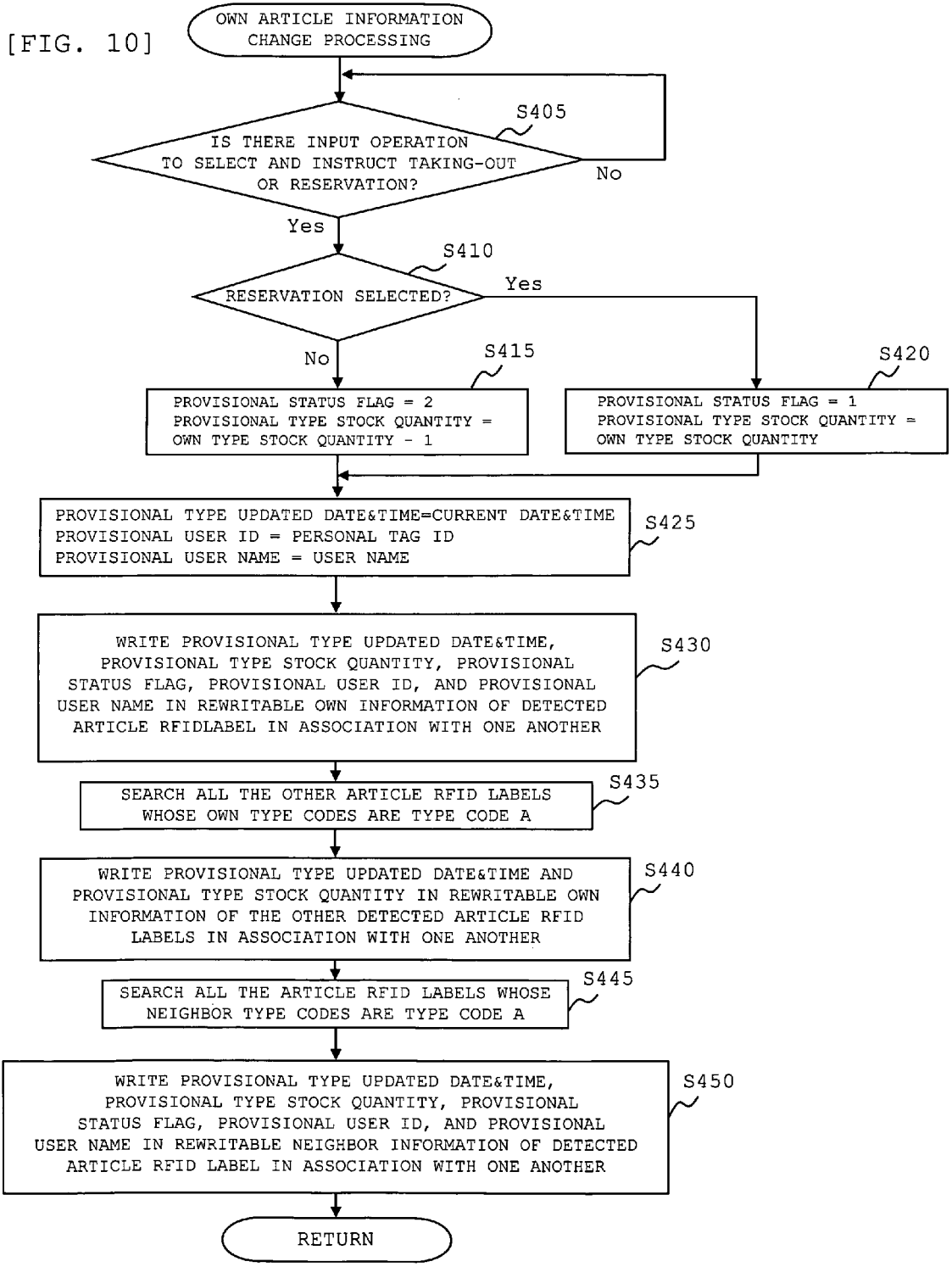
[FIG. 10]

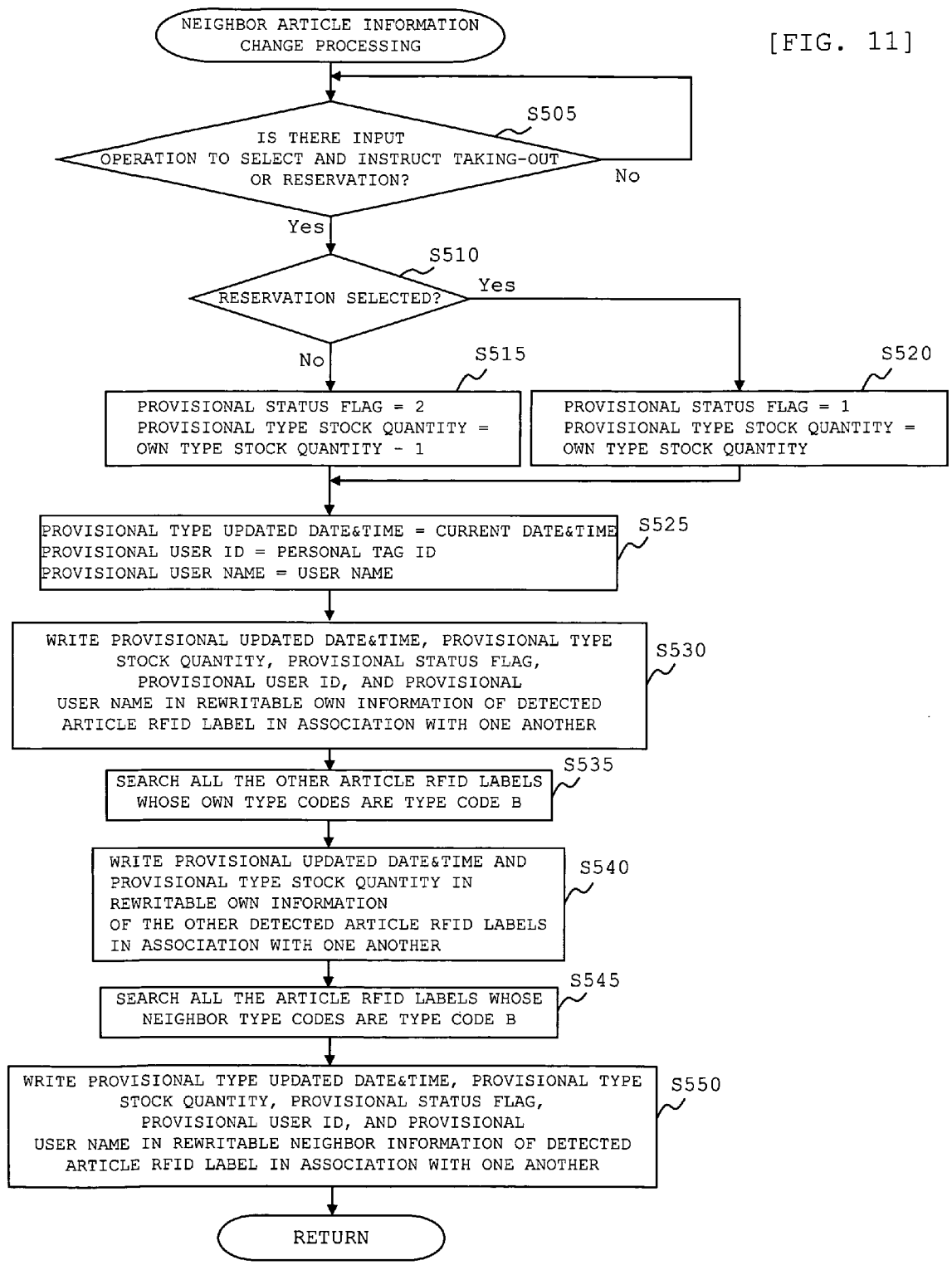
[FIG. 11]

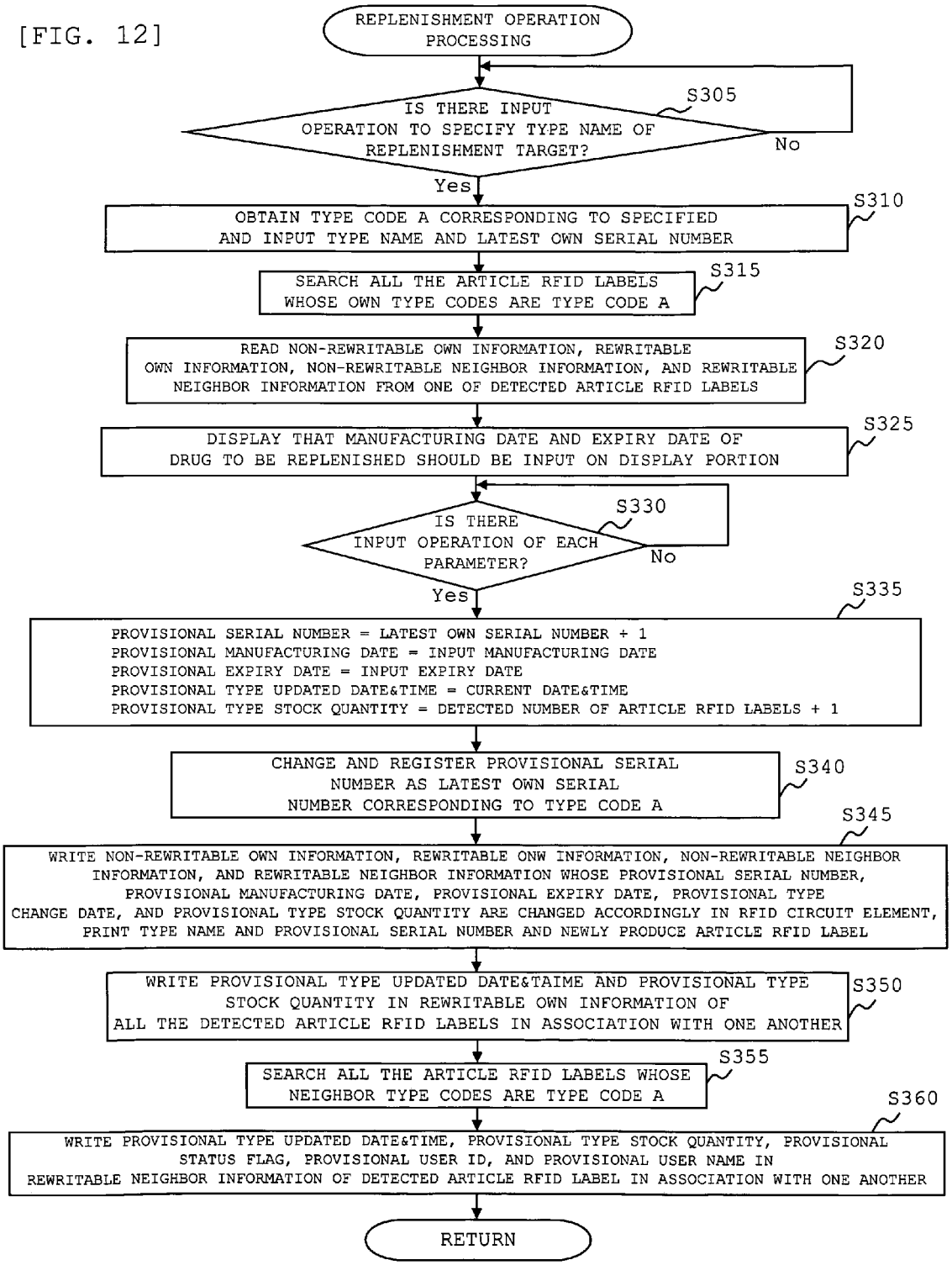
[FIG. 12]

ARTICLE MANAGEMENT SYSTEM, RFID TAG, AND APPARATUS FOR COMMUNICATING WITH RFID TAG

CROSS-REFERENCE TO RELATED APPLICATION

This is a CIP application PCT/JP2007/73762, filed Dec. 10, 2007, which was not published under PCT article 21(2) in English and claims the benefits of Japanese Patent application No. 2006-333734 filed Dec. 11, 2006.

BACKGROUND OF THE INVENTION

1. Field of the Invention

The present invention relates to an article management system configured to manage articles by reading information stored in radio frequency identification (RFID) tags attached to the articles, RFID tags used in the article management system, and an apparatus for reading RFID tags.

2. Description of the Related Art

In article management, it is known that an information holding portion, such as a barcode and an RFID tag, is provided for an article to be managed, and an apparatus for reading information configured to read the held information contactlessly has been known. For example, if an RFID tag is provided as the information holding portion, it is referred to as an RFID system.

In this system, a label-shaped RFID tag includes an RFID tag circuit element. The RFID tag circuit element includes an IC circuit part storing predetermined RFID tag information and an antenna connected to the IC circuit part for information transmission/reception. Even if the RFID tag is stained or arranged in a hidden place, the RFID tag information of the IC circuit part can be accessed (for information reading/writing) from a reader/writer. Thus, the system has been put into practical use in various fields.

Here, a method of storing predetermined identification information (tag ID) in the IC circuit part of the RFID tag circuit element and storing and holding article information (or target information) (or a part thereof) of a target corresponding to the identification information in a database has been already known. In this case, for example, the identification information of the RFID tag circuit element relating to the target is read by the reader, and the database is searched on the basis of the read identification information, so that the target information relating to the target is obtained from the database as appropriate.

As a prior art reference, there is an article management system described in JP, A, 2005-8346, for example. In this article management system (book collection management system), an RFID tag circuit element for book is provided for each book whose location is to be identified, while an RFID tag circuit element for shelf configured to having location information is provided at each shelf of a bookcase for movement management of the books. Further, a database is provided that stores correlation information (association information) between the tag ID (first tag identification information) of the RFID tag circuit element for book and book information and correlation information (association information) between the tag ID (second tag identification information) of the RFID tag circuit element for shelf and shelf information, and an operation terminal (a processing computer) is connected thereto, to enable searching the database.

In the above prior art reference, when movement or taking-out of each book is detected and managed every predetermined period, for example, an administrator moves a portable reading device across a shelf of books to sequentially read first tag identification information of an RFID tag circuit element for book provided for each book from one side of the shelf to the other side, read second tag identification information of an RFID tag circuit element for shelf when the reading device reaches the end of the shelf, and the two types of the tag identification information are both transmitted to an operation terminal via radio communication. After that, the administrator performs database manipulation at the operation terminal to associate the first tag identification information and second tag identification information transmitted from the reading device, by which book information such as the name and contents of each book and location information (shelf information) of the book are associated with each other and stored in a database, and the data is updated.

When it is necessary to know where a book should be arranged and stored in a bookcase, the administrator needs to first use the portable reading device to read first tag identification information from an RFID tag circuit element of the book, and then needs to use the terminal for operation to access the database with the first tag identification information of the RFID tag circuit element of the book, so as to obtain second tag identification information stored in an RFID tag circuit element of a shelf where the book is to be placed. This may impose an operation burden on article (book) management, resulting in inconvenient use.

SUMMARY OF THE INVENTION

The present invention has an object to provide an article management system, an RFID tag, and an apparatus for communicating with an RFID tag, which all can reliably recognize an arrangement position of an article with less operation burden on an administrator in article management and can improve convenience.

BRIEF DESCRIPTION OF THE DRAWING

FIG. 1 is a perspective view illustrating an appearance of a stock management system to which an article management system of the present invention is applied.

FIG. 2 is a system configuration diagram illustrating an outline of the stock management system.

FIG. 3 is a conceptual explanatory diagram illustrating an outline configuration of an RFID label producing portion.

FIG. 4A is a top view illustrating an entire outline structure of an article RFID label.

FIG. 4B is a bottom view of FIG. 4A.

FIG. 5 conceptually illustrates RFID tag information to be stored in an RFID tag circuit element of an article RFID label.

FIG. 6 conceptually illustrates an example of a neighbor status table to be stored in the RFID tag circuit element of the article RFID label.

FIG. 7 is a flowchart illustrating a control procedure of stock management processing executed by the CPU of a portable management apparatus.

FIG. 8 is a flowchart illustrating a detailed procedure of taking-out operation processing executed by the CPU of the portable management apparatus at Step S100 in FIG. 7.

FIG. 9 is a flowchart illustrating a detailed procedure of taking-out operation processing executed by the CPU of the portable management apparatus at Step S100 in FIG. 7.

FIG. 10 is a flowchart illustrating a detailed procedure of own article information change processing executed by the CPU of the portable management apparatus at Step S400 in FIG. 8.

FIG. 11 is a flowchart illustrating a detailed procedure of neighbor article information change processing executed by the CPU of the portable management apparatus at Step S500 in FIG. 9.

FIG. 12 is a flowchart illustrating a detailed procedure of replenishment operation processing executed by the CPU of the portable management apparatus at Step S300 in FIG. 7.

DETAILED DESCRIPTION OF THE PREFERRED EMBODIMENTS

An embodiment of the present invention will be described below referring to the attached drawings. This embodiment is an embodiment when the article management system of the present invention is applied to a stock management system configured to manage a stock of articles such as consumer goods.

FIG. 1 is a perspective view illustrating an appearance of a stock management system of this embodiment.

In FIG. 1, this stock management system (article management system) S is configured to monitor the status of articles placed in a cabinet 100 having three shelves (upper shelf 101, middle shelf 102, and lower shelf 103 in order from up to down). At least one drug container is arranged on each of the upper shelf 101, the middle shelf 102, and the lower shelf 103. Each container contains a drug of a type corresponding with the container. Hereinafter, a set with a drug included in a container and the container are referred to simply as "drug 1", in this document and figures. Thus, in this example, the drugs 1 are articles to be managed, which are consumer goods. The same type of drug 1 is discriminated and stored on each shelf of the cabinet 100. The type of the drug 1 stored on each of the shelves 101, 102 and 103 is determined in advance. In the cabinet 100, a drug 1A of a type A is stored on the upper shelf 101, a drug 1B of a type B is stored on the middle shelf 102, and a drug IC of a type C is stored on the lower shelf 103. Using the stock management system S, a user (operator or administrator) M carries out stock management of the drugs 1. Specifically, the user M can take out an arbitrary number of containers having the drug 1 of an arbitrary type from the cabinet 100, make a reservation for taking-out, and restock the drug 1.

As shown in FIG. 1, the stock management system S includes a personal tag Tj held by the user M, an article RFID label Tb affixed to a container of each drug 1 as an RFID tag in this embodiment, and a portable management apparatus 2, as an apparatus for communicating with an RFID tag according to this embodiment, configured to make an access (for reading or writing) to RFID tag information of the personal tag Tj and the article RFID label Tb via radio communication.

FIG. 2 is a system configuration diagram illustrating an outline of the stock management system S of this embodiment.

In FIG. 2, as described above, the stock management system S includes the personal tag Tj, the article RFID label Tb, and the portable management apparatus 2.

The portable management apparatus 2 has an apparatus main body 3 and an apparatus antenna (communication device) 4. The apparatus main body 3 is provided with a CPU (central processing unit) 5, an RFID label producing portion 6, memory 7 including a RAM, for example, and ROM, an operation portion 8 into which an instruction and information from a user (operator of the portable management apparatus) is input, a display portion (display device) 9 configured to display various information and messages, and an RF communication control portion 10 configured to control radio communication with the article RFID label Tb and the personal tag Tj through the apparatus antenna 4.

The CPU 5 conducts signal processing according to a program stored in the ROM in advance using a temporary storage function of the RAM, carries out processing of detection of the article RFID label Tb and the personal tag Tj, reading and writing of RFID tag information stored therein, and moreover, management of corresponding information, and carries out processing of producing the article RFID label Tb to the RFID label producing portion 6.

The article RFID label Tb is configured such that an RFID tag circuit element To including a tag antenna 151 and an IC circuit part 150 is provided for a tape-shaped material with an appropriate length that can be affixed to an article.

The personal tag Tj is, for example, an identification (ID) card provided with an RFID tag circuit element, the RFID tag circuit element having a same configuration as the RFID tag circuit element To provided at the article RFID label Tb. The personal tag Tj is held by the user as an employee ID or personal ID.

A memory part (not shown) of the IC circuit part 150 provided at each of the RFID labels Tb and the RFID labels Tj stores a tag ID. Every tag ID indicates that the tag ID is given to the RFID tag circuit element of the article RFID label Tb or is given to the RFID tag circuit element of the personal tag Tj. In response to a character of the tag ID as described above, the portable management apparatus 2 can discriminate and detect the article RFID label Tb and the personal tag Tj.

The RF communication control portion 10 of the portable management apparatus 2 is configured to obtain access to information of the IC circuit part 150 (RFID tag information including the tag ID; details will be described later) of the RFID tag circuit element To through the apparatus antenna 4. The CPU 5 of the portable management apparatus 2 has functions to read information by processing a signal read from the IC circuit part 150 of the RFID tag circuit element To and to create access information to access the IC circuit part 150 of the RFID tag circuit element To and controls an operation of the entire portable management device 2.

In the above stock management system S, at the take out of a drug 1 from the cabinet 100, the user M operates the portable management apparatus 2 in the vicinity of a management position of the drug 1 of the type to be taken out. Then, the portable management apparatus 2 reads information relating to the management state of the drug 1 of the type to be taken out (including the information relating to the management position) from the RFID tag circuit element To of the article RFID label Tb affixed to the drug 1 of the type to be taken out or an RFID tag circuit element To of a article RFID label Tb of a drug 1 RFID tag circuit element stored adjacently to the drug 1 of the type to be taken out, and the user M takes out or makes a taking-out reservation of the drug 1 on the basis of the information. Then, in order to respond to the management state changed by that, rewriting is carried out for each article RFID label Tb to change to information of the new management state by the portable management apparatus 2. At this time, information relating to the user M who takes out or reserves the take out of the drug 1 (e.g. user's name) is read from the personal tag Tj, which is reflected in the rewriting of the article RFID label Tb.

In the replenishment operation of the drug 1, the portable management apparatus 2 is operated in the vicinity of a management position of a drug 1 of a type to be replenished similarly to the taking-out operation. The portable management apparatus 2 reads information relating to the management state of the drug 1 of the type to be replenished from the article RFID label Tb of the drug 1 of the type to be replenished or an article RFID label Tb of a drug 1 of a type different from the type to be replenished, stored adjacently to the drug 1 of the type to be replenished. Hereinafter, the different type as described above is referred to simply as "neighbor type". Thus, the portable management apparatus 2 newly produces an article RFID label Tb to be affixed to the drug 1 to be replenished on the basis of the information. At this time, information of the management state of a type to be replenished and information of the management state of a neighbor type are written in the new article RFID label Tb. Then, rewriting to change to the information of the new management state is carried out by the portable management apparatus 2 on each of the article RFID labels Tb by the replenishment in order to respond to the management state changed.

In FIG. 3, the RFID label producing portion 6 has a cartridge holder 308, a print head 305, a producing portion antenna 306 and a radio frequency circuit 301, a cutter 307, and a feeding device 309. The cartridge holder 308 holds a cartridge 300 in which tag tape 303 provided with the RFID tag circuit elements To, which are spaced at predetermined intervals, is wound round a roll 304. The tag tape 303 is continuously supplied from the cartridge 300. The print head 305 is configured to perform desired printing on a predetermined area, corresponding to each RFID tag circuit element To, of the tag tape 303 fed out of the cartridge holder 308 (or a print-receiving medium, not shown, to be bonded to the tag tape 303). The producing portion antenna 306 and the radio frequency circuit 301 are configured to carry out information transmission and reception with the RFID tag circuit element To via radio communication. The control circuit 302 is connected to the CPU 5 through an input/output interface 310. The cutter 307 is configured to cut the tag tape 303 for which the print on the tag tape 303 and the information writing in the RFID tag circuit element To have been finished to a predetermined length to produce the RFID label Tb. The feeding device 309 is disposed opposite the print head 305 and configured to be controlled by the control circuit 302 so as to feed the tag tape 303.

The radio frequency circuit 301 and the control circuit 302 disposed in the RFID label producing portion 6 are provided with functions substantially equivalent to those of the RF communication control portion 10 and the CPU 5 of the above-described portable management apparatus 2. Namely, the radio frequency circuit 301 and the control circuit 302 transmits the RFID tag information (including the tag ID, which is the tag identification information) to the IC circuit part 150 of the RFID tag circuit element To (the RFID tag circuit element To provided at the article RFID label Tb or the personal tag Tj) to the RFID tag circuit element To through the producing portion antenna 306 and write the RFID tag information in the IC circuit part 150 of the RFID tag circuit element To. As the radio frequency circuit 301 and the control circuit 302 of the RFID label producing portion 6, the RF communication control portion 10 and the CPU 5 of the portable management apparatus 2 may be used.

FIGS. 4A and 4B are diagrams illustrating an example of an entire outline structure of the article RFID label Tb, and are a top view and a bottom view of the tab label Tb, respectively. In FIGS. 4A and 4B, the RFID label Tb has the RFID tag circuit element To arranged at the center of a label main body 149 substantially in a sheet shape, for example.

As shown in FIG. 4A, on the front side (upper face) of the label main body 149 of the article RFID label Tb, a print area P is provided in which a print character string R containing a type name of a drug 1 ("drug A" in this example) and a registration number of the drug 1 ("00275" in this example; own serial number will be described later). The registration number in the print character string R is an indispensable item for print. If another label on which a type name is described is affixed to the container of the drug 1, the print of the type name on the article RFID label Tb can be omitted.

In the above, the most distinctive feature of this embodiment is that information relating to the management position of the drug 1 is stored in the article RFID label Tb to be affixed to the drug 1, which is the management target article. Therefore, the arrangement position of the drug 1 can be directly read from the article RFID label Tb and can be surely recognized. The details will be sequentially described below.

First, in the example of this embodiment, the configuration of the RFID tag information to be stored in the RFID tag circuit element To of the article RFID label Tb will be described.

FIG. 5 conceptually illustrates the RFID tag information to be stored in the RFID tag circuit element To of the article RFID label Tb. The example shown in FIG. 5 is the RFID tag information stored in the article RFID label Tb to be affixed to a drug 1A of a type A placed and stored on the upper shelf 101 of the cabinet 100 in FIG. 1. The RFID tag information in the shown example is an information group made up of a large number of data and parameters and roughly classified into four types of information: non-rewritable own information, rewritable own information, non-rewritable neighbor information, and rewritable neighbor information.

The non-rewritable own information is information directly relating to the article (the drug 1A in this example; the same applies to the following) to which the article RFID label Tb is affixed and is a fixed information group which will not be rewritten (non-rewritable) after being recorded in new production of an article RFID label Tb for the first time. The non-rewritable own information in the shown example includes an article tag ID, an own type code (own target information), an own serial number (own target information), an own manufacturing date, own expiry date, and an own type management position (management position information). The article tag ID is tag identification information that uniquely identifies the RFID tag circuit element To provided at the article RFID label Tb among the RFID tag circuit elements To provided at all the article RFID labels Tb respectively. The article tag ID is recorded in each RFID tag circuit element To in advance by a user (or a manufacturer of the tag tape 303). The own type code corresponds to a type (type "A" in this example) of the article (hereinafter referred to as an own article) to which the article RFID label Tb is affixed. The own serial number is registered in series in the order of replenishment in the cabinet 100, for example, in the type of the own article. The own serial number corresponds to the article tag ID one by one, respectively. The own type management position is a storage position where each of the drugs 1 is stored. In this example, the own type management position is the upper shelf 101 in the cabinet 100 shown in FIG. 1.

The rewritable own information is information relating to a management state of the own article and is a variable information group that can be rewritten each time the management state of the article is changed (taken-out, reserved, replenished) even after being recorded in the new production of the article RFID label Tb. The rewritable own information in the shown example is constituted by an own type updated date and time (own arrival/shipping history information), an own type stock quantity (own total-stock information), an own status flag (own reservation information), an own user ID, and an own user name. The own type updated date and time indicates time and date when the rewritable own information is updated the last time by a change in the management state of the type of the own article. The own type stock quantity indicates a stock quantity currently stored at the management position of the type of the own article. The own status flag indicates a management state (reserved or not, having been taken out or not) of each of the own articles. The own user ID and the own user name indicates a user M when each of the drugs 1 has been taken out or reserved.

With regard to the own status flag among them, if it is "0", for example, it indicates that the article has not been reserved at the management position but in a storage state, "1" indicates a state in which the article is placed on the management position but taking-out in the future thereof has been already reserved by someone, and "2" indicates a state in which the article has been already taken out of the management position by someone. Also, the own type stock quantity indicates the total of the articles in storage ("0") and the articles having been reserved ("1").

The non-rewritable neighbor information is information directly relating to an article (hereinafter referred to as an neighbor article) stored in a predetermined range (adjacent stages in the vertical direction in this example) in the vicinity of the management position of the article to which the article RFID label Tb is affixed and is a fixed information group that can not be rewritten other than at the time of the new production similarly to the non-rewritable own information. The non-rewritable neighbor information in the shown example is constituted by an neighbor type code (neighbor target information) corresponding to a type (type "B" in this example) of the neighbor article, an neighbor type management position indicating a management position where the type of the neighbor article is stored (the middle shelf 102 in the cabinet 100 shown in FIG. 1 in this example), and an neighbor type compatibility flag (compatibility information) indicating presence/absence of compatibility of use of the type of the neighbor article and the type of the own article.

With regard to the neighbor type compatibility flag, this is a parameter indicating compatibility on whether or not the own article can be used instead of the neighbor article if the own article and the neighbor article are the same articles (the drug 1A and the drug 1B in this example, and they are common in terms of "drug"), for example. The presence/absence of compatibility may be indicated only by two stages of "0" and "1", may be indicated in stages of plural levels according to a degree of the compatibility or respective compatibility may be indicated corresponding to a plurality of use applications, for example.

The rewritable neighbor information is information relating to a management state of the article stored at a position adjacent to a management position of the article to which the article RFID label Tb is affixed and is a variable information group that is rewritten each time the management state of the neighbor article is changed other than the time of the new production similar to the rewritable own information. The rewritable neighbor information in the shown example is constituted by neighbor type updated date and time (neighbor arrival/shipping history information), a neighbor type stock quantity (neighbor-total-stock information), and a neighbor status table. The neighbor type updated date and time indicates time and date when the rewritable neighbor information is updated the last time due to a change in the management state of the type of the neighbor article. The neighbor type stock quantity indicates the stock quantity currently stored at the management position of the type of the neighbor article. The neighbor status table (See FIG. 6, which will be described later) indicates a management state of the neighbor article.

FIG. 6 conceptually illustrates an example of a neighbor status table to be stored in the RFID tag circuit element To of the article RFID label Tb. The neighbor status table of the example shown in FIG. 6 is constituted in a format of correlation information in which the neighbor status flag (neighbor-reservation information), neighbor user ID, and neighbor user name are stored corresponding to a neighbor serial number of each of the drugs 1 of the neighbor article having been stored at an adjacent position till the present time.

The neighbor status flag among them in this example indicates a state during storage if the content is "0", similarly to the own status flag, indicates a reserved state in the case of "1", and indicates a state in which the article has been already taken out of a management position in the case of "2". The neighbor user ID and neighbor user name are identification information that identifies the user M when the neighbor article has been taken out or reserved, and the personal tag ID and the user name (they will be described in detail later) read from the personal tag Tj held by the user M are applicable and recorded, respectively, in this example.

With regard to the RFID tag information shown in FIG. 5, the case of the RFID tag information corresponding to the drug 1A of the type A placed and stored on the upper shelf 101 of the cabinet 100 in FIG. 1 is shown as an example as described above. Therefore, the neighbor article is only the drug 1B of the type B placed and stored on middle shelf 102, and thus, only one (corresponding to one type) of the non-rewritable neighbor information and adjacent storage information is shown. However, in the case of the drug 1B of the type B placed and stored on the middle shelf 102, there are two types of the neighbor articles, which are the type A and the type C of the drug 1C placed and stored on the upper shelf 101 and the lower shelf 103, respectively, and if a memory capacity of the memory part of the RFID tag circuit element To is sufficiently large, two each of the non-rewritable neighbor information and the rewritable neighbor information may be stored corresponding to the two kinds (two types) of the neighbor articles.

Though not particularly shown, the RFID tag information to be stored in the RFID tag circuit element To of the personal tag Tj is constituted by the personal tag ID, which is identification information that uniquely specifies the RFID tag circuit element To provided at the personal tag Tj in all the RFID tag circuit elements To and the user name of the user M holding the personal tag Tj. In the memory 7 of the portable management apparatus 2, the respective type codes of the types of all the drugs 1 to be managed, the type names and the latest own serial numbers of the type are stored in association with one another.

FIG. 7 is a flowchart illustrating a control procedure of stock management processing executed by the CPU 5 of the portable management apparatus 2.

In FIG. 7, when the user M powers on the portable management apparatus 2, this flow is started. All the control procedures of this embodiment described below describe the case in which the drug 1A of the type A having the management position at the upper shelf 101 of the cabinet 100 shown in FIG. 1 is a main target article (own article) of the stock management (taking-out, reservation, replenishment) as an example. That is, the case in which the neighbor article is only the drug 1B of the type B on the middle shelf 102 is used as an example.

First, at Step S5, it is determined whether or not an operation to select and input either of taking-out operation processing and replenishment operation processing has been carried out by the user M through the operation portion 8. The routine waits in a loop till either of the operation processing is selected and input, and when the selection and input are made, the determination is satisfied, and the routine goes to the subsequent Step S10.

At Step S10, it is determined whether or not the operation processing selected and input at Step S5 is the taking-out operation processing. If the taking-out operation processing is selected and input, the determination is satisfied, and after the taking-out operation processing at Step S100 is executed, the routine goes to Step S15. On the other hand, if the replenishment operation processing is selected and input, the determination is not satisfied, and after the replenishment operation processing at Step S300, the routine goes to Step S15.

At Step S15, it is determined whether or not an operation to finish the flow of the stock management processing has been executed in the operation portion 8. If the finishing operation has not been executed, the determination is not satisfied, and the routine returns to Step S5 and this flow is repeated from the beginning. On the other hand, if the finishing operation has been executed, the determination is satisfied, and this flow is finished.

FIGS. 8 and 9 are flowcharts illustrating a detailed procedure of the taking-out operation processing executed by the CPU 5 of the portable management apparatus 2 at Step S100 in FIG. 7.

In FIG. 8, first, at Step S105, it is determined whether or not the input operation in which the user M selects and specifies a type name of the drug 1 (own article) to be taken out (including a reservation of taking-out) has been executed through the operation portion 8. At this selection and specification, it may be so configured that the type names of all the drugs 1 stored in the memory 7 are enumerated and displayed (menu display) so that a selection can be made from that. Then, the routine waits in a loop till the input operation to select and specify the type name of any drug 1, and if the input operation is executed, the determination is satisfied, and the routine goes to the subsequent Step S110.

At Step S110, a type code (type code A corresponding to the type A in this example; The same applies to the following) corresponding to the type name specified and input at Step S105 is obtained from the memory 7, and the routine goes to the subsequent Step S115.

At Step S115, to the RFID tag circuit element To of the article RFID label Tb affixed to each of the large number of drugs 1 stored in the cabinet 100, the article RFID label Tb having the own type code of the type code A in this example is searched through the RF communication control portion 10 and the apparatus antenna 4. Here, the "search" means to get the tag ID from the RFID tag circuit element To satisfying a specific condition (such that the own type code is the type code A in the above) using an inquiry signal, and the same applies to the following.

Subsequently, the routine goes to Step S120, where it is determined whether or not the corresponding article RFID label Tb has been detected in the search at Step S115 (if a response signal responding to the inquiry signal has been received through the apparatus antenna 4 and the RF communication control portion 10 or not). If even only one corresponding article RFID label Tb, that is, the article RFID label Tb whose own type code is the type code A in this example has been detected, the determination is satisfied, that is, it is regarded that at least one of the drug 1A of the type A the user M is to take out or reserve is stored in the cabinet 100, and the routine goes to Step S125.

At Step S125, the non-rewritable own information and the rewritable own information included in the response signal from the article RFID label Tb detected in the search at Step S115 are obtained. If a plurality of the article tags Tb is detected in the search at Step S115, they may be processed separately one by one using a known method.

In this example, the case in which the non-rewritable own information and the rewritable own information and moreover, the non-rewritable neighbor information and the rewritable neighbor information are included in the response signal responding to the inquiry signal at Step S120, as will be described later, is described as an example, but not limited to that. That is, if only the identification information (tag ID) is included in the response signal, for example, and the non-rewritable own information, rewritable own information, non-rewritable neighbor information, and rewritable neighbor information are not included, it may be so configured that the target RFID tag circuit element To is specified using the tag ID obtained by the response signal at Step S120, an information request signal is transmitted again through the RF communication control portion 10 and the apparatus antenna 4, and the non-rewritable own information, rewritable own information, non-rewritable neighbor information, and rewritable neighbor information included in the response signal are obtained (the same applies to the following).

At the subsequent Step S130, it is determined whether or not the content of the own status flag included in the rewritable own information obtained at Step S125 is "0", that is, whether or not the drug 1A to which the detected article RFID label Tb is affixed has been already reserved to be taken out by someone.

If the content of the own status flag is "1", that is, the corresponding own article has been already reserved and can not be taken out, the determination is not satisfied, and the routine goes to Step S135.

At Step S135, a control signal is output to the display portion 9 so as to display the own serial number in the non-rewritable own information read at Step S125 and that the drug 1A of the corresponding drug 1A has been already reserved on the display portion 9, and the routine returns to Step S115, where the search of the article RFID label Tb is executed again and the similar procedure is repeated. If the content of the own status flag is "2" at Step S130, it means a state in which the corresponding drug 1A has been already taken out of the cabinet 100 and is absent (including the case in which drug has been taken out of the cabinet 100 and is present in the vicinity of the cabinet 100). Therefore, at Step S135, the display portion 9 may display that the drug is absent similarly to the above.

In the second search and after at Step 115, it may be so configured that another article RFID label Tb of the same own type code A excluding the article RFID label Tb having been detected so far is searched, and presence/absence of detection of such another article RFID label Tb is determined at the subsequent Step S120. As a result, only the article RFID label Tb which can be taken out or can be newly reserved excluding the article RFID label Tb in the reserved state can be efficiently detected.

On the other hand, at the determination at Step S130, if the content of the own status flag is "0", that is, if the drug 1A to which the detected article RFID label Tb is affixed is in a stored state capable of being taken out, the determination is satisfied, and the routine goes to Step S140.

At Step S140, a control signal is output to the display portion 9 so as to display the non-rewritable own information and the rewritable own information obtained at Step S125 on the display portion 9. As a result, the fact that the drug 1A to which the most newly detected article RFID label Tb is affixed is a candidate of the article that can be currently taken out or reserved and the information relating thereto can be shown to the user M.

Subsequently, the routine goes to Step S145, where it is determined whether or not an input operation by the user M to instruct to take out or reserve the drug 1A displayed at Step S140 has been executed through the operation portion 8 or not. Here, the user M can determine whether or not to take out or reserve the corresponding drug 1A, by referring the non-rewritable own information and rewritable own information displayed on the display portion 9. If the input operation instructing that the drug 1A is not to be taken out by the user M is executed, the determination is not satisfied, that is, it is regarded that the user M refuses use of the drug 1A, and the flow is finished as it is. It may be so configured that the routine returns to Step S115, where search of the article RFID label Tb is started again in this case.

On the other hand, if the input operation that instructs that the drug 1A is to be taken out by the user M is executed, the determination at Step S145 is satisfied, and the routine goes to Step S150. At Step S150, the personal tag ID and the user name stored in the memory part are read from the RFID tag circuit element To of the personal tag Tj held by the user M. That is, similarly to the above, an inquiry signal is transmitted to the RFID tag circuit element To relating to the personal tag Tj through the RF communication control portion 10 and the apparatus antenna 4, a response signal responding to the inquiry signal is received through the apparatus antenna 4 and the RF communication control portion 10, and the user name information is obtained from the received signal. In this example, the case in which the response signal responding to the inquiry signal also includes the user name information is described as an example, but similarly to the above, it may be so configured that the target RFID tag circuit element To is specified using the tag ID obtained from the response signal, an information request signal is transmitted again through the RF communication control portion 10 and the apparatus antenna 4, and the user name information included in its response signal is obtained (the same applies to the following).

After that, a control signal is output to the display portion 9 at the subsequent Step S155 so as to display the personal tag ID and the user name, and confirmation by the user M is prompted.

Subsequently, the routine goes to Step S160, where it is determined if an input operation that the user M confirms that the displayed personal tag ID and the user name are correct has been executed or not. If the input operation to confirm correctness has not been executed, that is, if an input operation that the displayed personal tag ID and the user name are wrong has been executed, the determination is not satisfied, that is, it is regarded that malfunction such as wrong affixation of the personal tag Tj or wrong reading of the personal tag Tj of a person other than the genuine user M occurred, and the routine returns to Step S150 and the similar procedure is repeated. On the other hand, in the input operation confirming that the displayed personal tag ID and the username are correct, the determination is satisfied, own article information change processing that changes the information relating to the managed state of the own article is executed at the subsequent Step S400, and this flow is finished.

On the other hand, at the determination at Step S120, if no article RFID label Tb whose own type code is the type code A in this example (and which has not been reserved, either) is detected in the search at Step S115, the determination is not satisfied, that is, it is regarded that there is no drug 1A of the type A in this example intended by the user M, capable of being taken out or reserved, is stored in the cabinet 100, and the routine goes to a control procedure at Step S165 and after (For Step S165 and after, see FIG. 9).

FIG. 9 illustrates the control procedure at Step S165 and after. Here, the control procedure at Step S165 and after described below is to process the taking-out operation while checking use compatibility of the type B stored at a management position (the middle shelf 102 in this case) adjacent to the type A with respect to the type A when there is no drug 1A of the type A in this example intended for use by the user M that can be taken out or reserved in the cabinet 100.

In FIG. 9, first, at Step S165, only one article RFID label Tb whose neighbor type code is the type code A in this example is searched with respect to the RFID tag circuit element To of the article RFID label Tb affixed to each of the large number of drugs 1 stored in the cabinet 100 through the RF communication control portion 10 and the apparatus antenna 4. In this example, since the drug 1A of the type A to which the article RFID label Tb whose own type code is the type code A is affixed is stored on the upper shelf 101 (uppermost end position) of the cabinet 100, the one detected as the article RFID label Tb whose neighbor type code is the type code A is the article RFID label Tb affixed to the drug 1B of the type B stored on the middle shelf 102 of the cabinet 100.

Subsequently, the routine goes to Step S170, where it is determined whether or not the corresponding article RFID label Tb has been detected (a response signal responding to the inquiry signal has been received through the apparatus antenna 4 and the RF communication control portion 10) in the search at Step 165. If even only one corresponding article RFID label Tb, that is, the article RFID label Tb whose neighbor type code is the type code A in this example is detected, the determination is satisfied, that is, it is regarded that at least one drug (drug 1B of the type B in this example) at a management position adjacent to the drug 1A of the type A originally intended to be taken out or reserved by the user M is stored in the cabinet 100, and the routine goes to Step S175. On the other hand, if no corresponding article RFID label Tb is detected, the determination at Step S170 is riot satisfied, and this flow is finished.

At Step S175, the non-rewritable own information, rewritable own information, non-rewritable neighbor information, and rewritable neighbor information included in the response signal from the single article RFID label Tb detected in the search at Step S165 are obtained.

At the subsequent Step S180, it is determined whether or not the content of the own status flag included in the rewritable own information is "0", that is, whether or not each of the drug 1B of the type B in this example to which the detected article RFID label Tb is affixed has been already reserved for taking-out by someone.

If the content of the own status flag is "1", that is, if the corresponding own article (that is, each of the detected drug 1B of the type B in this example) has been already reserved and can not be taken out, the determination is not satisfied, and the routine goes to Step S185.

At Step S185, display similar to that at Step S135 is made on the display portion 9, and the routine returns to Step S165, where the search of the article RFID label Tb is carried out again and the similar procedure is repeated.

It may be so configured that in the second search and after at Step S165, too, another article RFID label Tb with the own type code B (that is, the neighbor type code A) excluding the article RFID labels Tb having been detected so far is searched similarly to Step S115.

On the other hand, in the determination at Step S180, if the content of the own status flag is "0", that is, if the drug 1B to which the detected article RFID label Tb is affixed is stored capable of being taken out, the determination is satisfied, and the routine goes to Step S190.

At Step S190, the type name B corresponding to the type code B of this example of the own type code included in the non-rewritable own information read at Step S175 is obtained from the memory 7, and the routine goes to the subsequent Step S195.

At Step S195, a control signal is output to the display portion 9 so that the type name B of this example obtained at Step S190 and the non-rewritable own information, rewritable own information, non-rewritable neighbor information, and rewritable neighbor information read at Step S175 are displayed on the display portion 9. As a result, the information relating to the drug 1B to which the most newly detected article RFID label Tb is affixed can be shown to the user M.

Subsequently, the routine goes to Step S200, where it is determined whether or not the input operation to instruct taking-out or reservation of the drug 1B displayed at Step S195 by the user M has been executed through the operation portion 8. Here, the user M can determine whether or not the corresponding drug 1B is to be taken out or reserved, by referring to the non-rewritable own information, rewritable own information, non-rewritable neighbor information, and rewritable neighbor information displayed on the display portion 9. Particularly, by the user M referring to the neighbor type compatibility flag included in the non-rewritable neighbor information, use compatibility on whether or not the detected drug 1B of the type B in this example can be used instead of the drug 1A of the type A in this example originally intended by the user M can be checked, and whether or not to take it out or reserve it can be examined.

If the user M executes the input operation not instructing the taking-out of each of the drug 1B of the type B, the determination is not satisfied, that is, it is regarded that the user M refused the use of the drug 1B of the type B, and this flow is finished as it is. It may be so configured that the routine returns to Step S165 to restart at the search of the article RFID label Tb in this case.

On the other hand, if the user M executes the input operation to instruct taking-out of the drug 1B of the type B, the determination is satisfied, and the routine goes to Step S205. Here, the subsequent Step S205, Step S210, and Step S215 are a procedure to have the personal tag ID and the user name read from the personal tag Tj of the user M checked by the user M similarly to Step S150, Step S155, and Step S160, and the description here will be omitted.

If in the determination at Step S215, the input operation confirming that the displayed personal tag ID and the user name are correct is executed, the determination is satisfied, and the routine goes to the subsequent Step S500, where the neighbor article information change processing that changes the information relating to the management state of the drug 1B of the type B in this example (the neighbor article to the drug 1A of the type A in this example intended by the genuine user M) is executed, and this flow is finished.

FIG. 10 is a flowchart illustrating a detailed procedure of the own article information change processing executed by the CPU 5 of the portable management apparatus 2 at Step S400 in FIG. 8. All the provisional variables attached with a term "provisional" at the beginning of a word in the description below are variables used for change rewriting of the RFID tag information for convenience in explaining this embodiment and stored in the RAM of the memory 7, for example, as provisional values till they are written.

In FIG. 10, first at Step S405, it is determined if an operation to select and input on whether or not drug 1A of the type A in this example determined by the user M to be taken out at Step S145 in FIG. 8 is to be actually taken out from the cabinet 100 or only reserved at this time has been executed through the operation portion 8. The routine waits in a loop till any selection and input is made, and if the selection and input is made, the determination is satisfied, and the routine goes to the subsequent Step S410.

At Step S410, it is determined if the reservation was selected at Step S405 or not. If the taking-out is selected, the determination is not satisfied and the routine goes to Step S415, and "2" (having been taken out) is assigned to a provisional status flag. A value obtained by subtracting one from the own type stock quantity obtained at Step S125 in FIG. 8 is assigned to a provisional-type stock quantity, and the routine goes to Step S425. On the other hand, if the reservation is selected, the determination at Step S410 is satisfied, and the routine goes to Step S420, where "1" (reserved) is assigned to the provisional status flag, the own type stock quantity obtained at Step S125 in FIG. 8 is assigned to the provisional-type stock quantity as it is and the routine goes to Step S425.

At Step S425, a current time and date at that time is assigned to a provisional-type updated date and time, and the personal tag ID (used as identification information that specifies the person) and the user name read at Step S150 in FIG. 8 are assigned to the provisional user ID and a provisional user name, respectively.

Subsequently, the routine goes to Step S430, where the provisional variables set as above are written in the rewritable own information of the detected article RFID label Tb as change information in association with each other. That is, by transmitting a writing signal such as a known "Program" signal through the RF communication control portion 10 and the apparatus antenna 4 to the RFID tag circuit element To of the article RFID label Tb detected and specified at Step S115 in FIG. 8 and for which the taking-out or reservation is determined by the user M at Step S145, the writing is made so that the own type updated date and time stored in the RFID tag circuit element To is replaced by the provisional-type updated date and time, the own type stock quantity is replaced by the provisional-type stock quantity, the own status flag is replaced by the provisional status flag, the own user ID is replaced by the provisional user ID, and the own user name is replaced by (changed to) the provisional user name.

Subsequently, the routine goes to Step S435, and similarly to the above-described Step S115, the article RFID label Tb whose own type code is the type code A in this example other than the article RFID label Tb written in at Step S430 is searched.

After that, at the subsequent Step S440, by transmitting the writing signal such as the known "Program" signal through the RF communication control portion 10 and the apparatus antenna 4 to the RFID tag circuit element To of the article RFID label Tb searched, detected and specified at Step S435, the provisional-type updated date and time and the provisional-type stock quantity are written in the stored rewritable own information in association with each other. If a plurality of the article tags Tb is detected in the search at Step S435, it is only necessary that the processing is executed separately one by one by a known method. As a result, required information update is executed for all the article RFID labels Tb affixed to the drug 1A of the type A in this example.

Subsequently, the routine goes to Step S445, where similarly to the above-described Step S165, the article RFID label Tb whose neighbor type code is the type code A in this example (that is, the article RFID label Tb of the own type code B affixed to the drug 1B of the type B in this example) is searched.

Then, at the subsequent Step S450, by transmitting the writing signal such as the known "Program" signal through the RF communication control portion 10 and the apparatus antenna 4 to the RFID tag circuit element To of the article RFID label Tb searched, detected and specified at Step S445, the stored provisional variables set as above are written in the stored rewritable neighbor information as change information in association with each other. That is, the writing is made so that the neighbor type updated date and time is replaced by the provisional-type updated date and time, the neighbor type stock quantity is replaced by the provisional-type stock quantity, the neighbor status flag is replaced by the provisional status flag, the neighbor user ID is replaced by the provisional user ID, and the neighbor user name is replaced by (changed to) the provisional user name. The provisional status flag, provisional user ID, and provisional user name are written in the neighbor status table in association with the neighbor serial numbers, respectively. If a plurality of article tags Tb is detected in the search at Step S445, they may be processed separately one by one using a known method. As a result, required information is updated for all the article RFID labels Tb affixed to the drug 1B of the type B in this example (neighbor article to the drug 1A of the type A in this example). Then, this flow is finished.

FIG. 11 is a flowchart illustrating a detailed procedure of the neighbor article information change processing executed by the CPU 5 of the portable management apparatus 2 at Step S500 in FIG. 9 and functionally corresponds to FIG. 10.

The function of the flow in FIG. 11 is substantially the same as that in FIG. 10 and is different in a point that Step S435, Step S445 in FIG. 10 are replaced by Step S535, Step S545 in FIG. 11 instead. Only the different procedure will be described below.

In FIG. 11, at Step S535, the article RFID label Tb whose own type code is the type code B in this example other than the article RFID label Tb written in at Step S530 is searched. At the subsequent Step S540, by transmitting the writing signal similarly to the above to the rewritable own information of the article RFID label Tb searched, detected and specified at Step S535, the provisional-type updated date and time and the provisional-type stock quantity are written in association, respectively. If a plurality of article tags Tb is detected in the search at Step S535, they may be processed separately one by one using a known method. As a result, required information update is executed to all the article RFID labels Tb affixed to the drug 1B of the type B in this example.

Subsequently, the routine goes to Step S545, where similarly to the above-described Step S165, the article RFID label Tb whose neighbor type code is the type code B (the article RFID labels Tb in the reserved state of the drug 1A of the type A and of the own type codes A, C affixed to the drug 1C of the type C in this example) is searched.

Then, at the subsequent Step S550, by transmitting the writing signal such as the known "Program" signal through the RFID communication control portion 10 and the apparatus antenna 4 to the RFID tag circuit element To of the article RFID label Tb searched, detected, and specified at Step S545, the provisional-type updated date and time, provisional-type stock quantity, provisional status flag, provisional user ID, and provisional user name are written in the stored rewritable neighbor information in association with each other, as change information. If a plurality of article tags Tb is detected in the search at Step S545, they may be processed separately one by one using a known method. As a result, required information update is executed for all the article RFID labels Tb affixed to the drug 1A of the type A and the drug 1C of the type C (the neighbor articles to the drug 1B of the type B in this example) in this example. Since the other procedures are the same as those in FIG. 10, the description will be omitted.

FIG. 12 is a flowchart illustrating a detailed procedure of replenishment operation processing executed by the CPU 5 of the portable management apparatus 2 at Step S300 in FIG. 7.

In FIG. 12, first, at Step S305, it is determined whether or not an input operation to select and specify a type name of a drug 1 to be replenished by the user M has been executed through the operation portion 8. In this selection and input, it may be so configured that the type names of all the drugs 1 stored in the memory 7 are enumerated and displayed (menu display) so that a selection can be made from them. Then, the routine waits in a loop till the input operation to select and specify a type name of any of the drugs 1 is executed, and if the input operation is executed, the determination is satisfied, and the routine goes to the subsequent Step S310.

At Step S310, a type code corresponding to the type name specified and input at Step S305 (type code A corresponding to the type A in this example) and the latest own serial number (=the total of the drugs 1A of the type A having been stored so far) are obtained from the memory 7, and the routine goes to the subsequent Step S315.

At Step S315, with respect to the RFID tag circuit element To of the article RFID label Tb affixed to each of the large number of the drugs 1 stored in the cabinet 100, the article RFID label Tb whose own type code is the type code A in this example is searched through the RF communication control portion 10 and the apparatus antenna 4.

Subsequently, the routine goes to Step S320, where the non-rewritable own information, rewritable own information, non-rewritable neighbor information, and rewritable neighbor information are read from one of the article RFID labels Tb detected in the search at Step S315. That is, similarly to the above, an inquiry signal is transmitted to the RFID tag circuit element To relating to the article RFID label Tb through the RF communication control portion 10 and the apparatus antenna 4, a response signal responding to the inquiry signal is received through the apparatus antenna 4 and the RF communication control portion 10, and the non-rewritable own information, rewritable own information, non-rewritable neighbor information, and rewritable neighbor information are obtained from the received signal. As described above, it may be so configured that the target RFID tag circuit element To is specified using the tag ID obtained by the first response signal, the information request signal is transmitted again, and the non-rewritable own information, rewritable own information, non-rewritable neighbor information, and rewritable neighbor information included in the response signal are obtained.

Subsequently, the routine goes to Step S325, where a control signal is output to the display portion 9 so that a display is made that a manufacturing date and expiry date of each of the drugs 1A to be replenished is required to be input by the user M.

Subsequently, the routine goes to Step S330, where it is determined whether or not an operation to input each parameter of the manufacturing date and expiry date has been executed by the user M through the operation portion 8. Then, the routine waits in a loop till the input operation of the both parameters is executed, and if the input operation is executed, the determination is satisfied, and the routine goes to the subsequent Step S335.

At Step S335, a value obtained by adding one to the latest own serial number obtained at Step S310 is assigned to a provisional serial number, the manufacturing date and the expiry date input at Step S330 are assigned to a provisional manufacturing date and a provisional expiry date in association with each other, the current time and date at that time is assigned to a provisional-type updated date and time, and a value obtained by adding one to the detected number of the article RFID labels Tb (of the own type code A in this example) detected in the search at Step S315 is assigned to a provisional-type stock quantity.

Subsequently, the routine goes to Step S340, where the latest own serial number corresponding to the type A in this example stored in the memory 7 of the portable management apparatus 2 and to be replenished is replaced by (changed to) a provisional serial number and registered.

Subsequently, the routine goes to Step S345, where the article RFID label Tb to be affixed to each of the drug 1A to be replenished is newly produced. This is executed by, first, setting the RFID tag information of the article RFID label Tb of the type code A in this example read at Step S320 (non-rewritable own information, rewritable own information, non-rewritable neighbor information, and rewritable neighbor information) as provisional RFID tag information and by changing each of the provisional variables having been set as above as change information in association with each other.

That is, the writing is executed so that the own serial number provisionally set and stored in the memory 7 such as the RAM is replaced by the provisional serial number, first, for example, the own manufacturing date is replaced by the provisional manufacturing date, the own expiry date is replaced by the provisional expiry date, the own type updated date and time is replaced by the provisional-type updated date and time, and the own type stock quantity is replaced by (changed to) the provisional type stock quantity. At this time, the own status flag, own user ID, and own user name are set to the respective initial values (the own status flag to "0" and the own user ID and own user name to blank). Also, in this case, only the setting in the memory 7 of the portable management apparatus 2 is changed instead of writing in the article RFID label Tb as a source of reading via radio communication.

Then, the provisional RFID tag information set as above and the type name of the type A in this example are output to the input/output interface 310 of the RFID label producing portion 6. As a result, similarly to the above, by transmitting the writing signal such as the known "Program" signal to the RFID tag circuit element To of the tag tape 303 used for the article RFID label Tb to be newly produced relating to the drug 1A to be replenished through the control circuit 302, the radio frequency circuit 301, and the producing portion antenna 306, the provisional RFID tag information is written in the RFID tag circuit element To, and the type name of the type A of this example and the provisional serial number are printed on the predetermined print area P on the tag tape 303 by the operation of the print head 305 (See FIG. 4). It may be so configured that writing is not made only for the article tag ID but the tag ID recorded in the RFID tag circuit element To recorded by a manufacturer of the tag tape 303 in advance is used as it is as described above. The user M can replenish the article RFID label Tb produced as above at the management position in the cabinet 100 by affixing it to each of the drugs 1A to be replenished.

Subsequently, the routine goes to Step S350, where by transmitting the writing signal such as the known "Program" signal to the RFID tag circuit element To of the article RFID label Tb searched, detected and specified at Step S315 (the article RFID label Tb of the own type code A currently present in the cabinet 100 in this example) through the RF communication control portion 10 and the apparatus antenna 4, the provisional variables having been set as above is written as change information in association with the stored rewritable own information, respectively. That is, the writing is executed so that the own type updated date and time is replaced by the provisional-type updated date and time and the own type stock quantity by the provisional-type stock quantity, respectively. If a plurality of article tags Tb is detected in the search at Step S320, they may be processed separately one by one using a known method.

Subsequently, the routine goes to Step S355, where similarly to the above-described Step S165, the article RFID label Tb whose neighbor type code is the type code A in this example is searched.

At the subsequent Step S360, by transmitting a writing signal such as the known "Program" signal to the RFID tag circuit element To of the article RFID label Tb searched, detected and specified at Step S355 through the RF communication control portion 10 and the apparatus antenna 4, the provisional variables having been set as above are written as change information in association with the stored rewritable neighbor information, respectively. That is, the writing is executed so that the neighbor type updated date and time is replaced by (changed to) the provisional-type updated date and time, the neighbor type stock quantity by the provisional-type stock quantity, the neighbor status flag by the provisional status flag, the neighbor user ID by the provisional user ID, and the neighbor user name by the provisional user name. If a plurality of article tags Tb is detected in the search at Step S355, they may be processed separately one by one using a known method. As a result, required information is updated for all article RFID labels Tb affixed to the drug 1B of the type B in this example (neighbor article to the drug 1A of the type A in this example). Then, this flow is finished.

In the above, a procedure at Step S125 in the flow of FIG. 8 functions as a position-information obtainment portion configured to obtain a own type management position stored in the IC circuit part 150 of the RFID tag circuit element To through the apparatus antenna 4. Also, a procedure at Step S115 in FIG. 8, Step S435 in FIG. 10, and Step S535 in FIG. 11 functions as a first tag-identification information obtainment portion configured to obtain an article tag ID stored in the IC circuit part 150 of the RFID tag circuit element To corresponding to the own type code using an inquiry signal including the own type code.

The procedure at Step S125 also functions as a first history-information obtainment portion configured to obtain the own type updated date and time stored in the IC circuit part 150, a first total-stock-information obtainment portion configured to obtain the own type stock quantity stored in the IC circuit part 150, and a first reservation-information obtainment portion configured to obtain the own status flag stored in the IC circuit part 150.

Also, the procedure at Step S140 in the flow of FIG. 8 functions as a position-information display output portion configured to output a signal that displays the own type management position obtained as above on the display portion 9.

Also, the procedure at Step S175 in the flow of FIG. 9 functions as the position-information obtainment portion configured to obtain the own type management position stored in the IC circuit part 150 of the RFID tag circuit element To through the apparatus antenna 4. Also, the procedure at Step S165 in FIG. 9, Step S445 in FIG. 10, Step S545 in FIG. 11 functions as a second tag-identification information obtainment portion configured to obtain the article tag ID of the RFID tag circuit element To provided with the IC circuit part 150 storing the neighbor type code using the inquiry signal including the neighbor type code.

The procedure at Step S175 also functions as a second history-information obtainment portion configured to obtain the neighbor type updated date and time stored in the IC circuit part 150, a second total-stock-information obtainment portion configured to obtain the neighbor type stock quantity stored in the IC circuit part, a second reservation-information obtainment portion configured to obtain the neighbor status flag stored in the IC circuit part 150, and a compatibility-information obtainment portion configured to obtain the neighbor type compatibility flag stored in the IC circuit part 150.

Also, the procedure at Step S195 in the flow of FIG. 9 functions as the position-information display output portion configured to output a signal that displays the own type management position obtained as above on the display portion 9 and also functions as a compatibility-information display output portion configured to output a signal that displays the neighbor type compatibility flag obtained as above on the display portion 9.

Also, the procedure at Step S430 and Step S440 in the flow of FIG. 10 and at Step S530 and Step S540 in the flow of FIG. 11 functions as a first writing portion configured to write the own type stock quantity updated corresponding to the arrival/shipping of the drug in the IC circuit part 150 of the RFID tag circuit element To of the drug of the applicable type through the apparatus antenna 4.

Also, the procedure at Step S450 in the flow of FIG. 10 and the procedure at Step S550 in the flow of FIG. 11 function as a second writing portion configured to write the neighbor type stock quantity updated corresponding to the arrival/shipping of the drug in the IC circuit part 150 of the RFID tag circuit element To of the drug of the applicable type through the apparatus antenna 4.

In this embodiment configured as above, the article RFID label Tb provided with the RFID tag circuit element To is handled in relation with the drug 1 of the type to be managed (affixed in this example. It may be inclusion, attachment other than that.), and the own type code and the own type management position of the drug 1 are stored in the IC circuit part 150 of the RFID tag circuit element To. If radio communication is conducted with the RFID tag circuit element To by the apparatus antenna 4 of the portable management apparatus 2, the own type management position is obtained by the procedure at Step S125 in the flow of FIG. 8, a signal corresponding to that is output to the display portion 9 by the procedure at Step S140 in the flow of FIG. 8, and the own type management position of the drug 1 of the type associated with the RFID tag circuit element To (position of the shelf in the cabinet 100) is displayed on the display portion 9.

As described above, only by reading the RFID tag information of the article RFID label Tb affixed to the drug 1 of the type to be managed (without particularly making an access to a database), a position where the drug 1 of the type should be arranged/stored is displayed, and the user M (operator, administrator) can surely recognize the arrangement position of the drug 1 of each type, and convenience in the article management can be improved.

Also, particularly in this embodiment, by making an inquiry with an inquiry signal by specifying the own type code, if there is a response of the RFID tag circuit element To, the drug 1 of the type to be managed associated with the RFID tag circuit element To is the article desired to be searched. Thus, by obtaining the article tag ID of the responding RFID tag circuit element To by the procedure at Step S115 in the flow of FIG. 8, the RFID tag circuit element To can be specified using the article tag ID on the basis of the obtainment result. As a result, the own type management position of the drug 1 of the type to be managed is obtained by the procedure at Step S125 in the flow of FIG. 8 with respect to the specified RFID tag circuit element To, and the arrangement position of the drug 1 of the type can be specified.

Also, particularly in this embodiment, by obtaining the own type updated date and time from the RFID tag circuit element To responding to the inquiry signal specifying the own type code, history of taking-out, reservation of the taking-out, and replenishment of the drug 1 of the type to be searched can be checked. Similarly, by obtaining the own type stock quantity from the RFID tag circuit element To responding to the inquiry signal, the stock quantity of the drug 1 of the type desired to be searched can be checked. At this time, by updating the own type stock quantity according to the arrival/shipping of the drug 1 and by writing it in the RFID tag circuit element To, any fluctuation in the stock can be surely reflected, and the latest information can be stored in each RFID tag circuit element To all the time. Similarly, by obtaining the own status flag from the RFID tag circuit element To responding to the inquiry signal specifying the own type code, it can be checked if the drug 1 of the type desired to be searched has been reserved to be used. As a result, convenience can be further improved.

Also, particularly in this embodiment, by making an inquiry with the inquiry signal specifying neighbor type code, if there is a response of the RFID tag circuit element To responding to that, (even if there is no response to the inquiry signal specifying the own target information), the article to be managed associated with the RFID tag circuit element To is an article whose arrangement position is close to the article desired to be searched. If radio communication is conducted with the RFID tag circuit element To by the apparatus antenna 4 of the portable management device 2, the own type management position is obtained by the procedure at Step S175 in the flow of FIG. 9, and a signal corresponding to that is output to the display portion 9 by the procedure at Step S195 in the flow of FIG. 9. As a result, the own type management position (position of the shelf in the cabinet 100) of the drug 1 of the type associated with the RFID tag circuit element To can be displayed on the display portion 9.

Then, by obtaining the article tag ID of the responding RFID tag circuit element To by the procedure at Step S165 in the flow of FIG. 9, the RFID tag circuit element To can be specified using the article tag ID on the basis of the obtainment result. As a result, by obtaining the own type management position by the procedure at Step S175 in the flow of FIG. 9 with respect to the specified RFID tag circuit element To, the arrangement position of the article (article close to the article desired to be searched) can be specified.

Also, particularly in this embodiment, even if there is no drug 1 of the type desired to be searched at a predetermined arrangement position and no RFID tag circuit element To responds to the inquiry signal specifying the own type code corresponding to that, if there is an RFID tag circuit element To responding to the inquiry signal specifying the neighbor type code, the neighbor type updated date and time (=corresponding to the own type updated date and time of the drug 1 desired to be searched) can be obtained. As a result, the updated date and time (arrival/shipping history) of the drug 1 of the type desired to be searched can be checked, management becomes possible even if the drug 1 of a type desired to be searched is absent, and convenience can be further improved.

Also, particularly in this embodiment, if there is an RFID tag circuit element To responding to the inquiry signal specifying the neighbor type code, the neighbor type stock quantity (=corresponding to the own type stock quantity of the drug 1 of the type desired to be searched) can be obtained and a stock quantity of the drug 1 of the type desired to be searched can be checked, management becomes possible even if the drug 1 of the type desired to be searched is absent. At this time, by updating the neighbor type stock quantity according to the arrival/shipping of the drug 1 and writing it in the RFID tag circuit element To, any fluctuation in the stock can be surely reflected, and latest information can be stored in each RFID tag circuit element To all the time. Similarly, if there is an RFID tag circuit element To responding to the inquiry signal, a neighbor status flag (=corresponding to the own status flag of the drug 1 of the type desired to be searched) can be obtained. As a result, it can be checked if a drug 1 of the type desired to be searched has been already reserved to be taken out. Similarly, if there is an RFID tag circuit element To responding to the inquiry signal, the neighbor compatibility flag can be obtained and displayed. As a result, it can be checked if the drug 1 of another type can be used instead of the drug 1 of the type desired to be searched. As a result, convenience can be further improved.

In the above, even if the drug 1 of the article to be managed is located at a predetermined spot (each shelf), it is determined if the article has been reserved or not, but not limited to that. It may be so configured that management can be conducted without reserving the drug 1 as above but only according to whether or not the article has been taken out and is absent or has not been taken out and present.

The "Program" signal used in the above shall comply with the specification formulated by EPC global. The EPC global is a non-profit corporation jointly established by International EAN Association, which is an international organization of distribution codes, and UCC (Uniformed Code Council), which is an U.S. distribution code organization. Signals complying with other standards will do as long as they serve the same functions.

Other than those as described above, methods of the embodiments and each variation may be combined as appropriate for use.

Though not specifically exemplified, the present invention should be put into practice with various changes made in a range not departing from its gist.

What is claimed is:

1. An article management system comprising: a plurality of radio frequency identification (RFID) tag circuit elements respectively handled in association with articles to be managed; and an apparatus for communicating with an RFID tag, each of said RFID tag circuit elements having an IC circuit part storing information and a tag antenna for information transmission/reception, said IC circuit part storing tag identification information, own target information of said article to be managed, and management position information of the article to be managed, and said apparatus for communicating with an RFID tag having: a communicating device configured to carry out information transmission/reception with said RFID tag circuit element via radio communication; a position-information obtainment portion configured to obtain said management position information stored in said IC circuit part of said RFID tag circuit element through said communicating device; and a position-information display output portion configured to output a signal for displaying said management position information obtained by said position-information obtainment portion to a display device, wherein:
said IC circuit part of each of said plurality of RFID tag circuit elements stores own reservation information indicating presence/absence of reservation of use of the corresponding article to be managed; and
said apparatus for communicating with an RFID tag includes a first reservation-information obtainment portion configured to obtain said own reservation information stored in said IC circuit part.

2. The article management system according to claim 1, wherein: said apparatus for communicating with an RFID tag includes a first tag-identification information obtainment portion configured to obtain said tag identification information stored in said IC circuit part of said RFID tag circuit element corresponding to said own target information using an inquiry signal including the own target information.

3. The article management system according to claim 2, wherein: said IC circuit part of each of the plurality of RFID tag circuit elements stores own arrival/shipping history information indicating arrival/shipping history of a corresponding article to be managed; and said apparatus for communicating with an RFID tag includes a first history-information obtainment portion configured to obtain said own arrival/shipping history information stored in said IC circuit part.

4. The article management system according to claim 2, wherein: said IC circuit part of each of the plurality of RFID tag circuit elements stores own total-stock information indicating a total stock quantity of the corresponding article to be managed; and said apparatus for communicating with an RFID tag has a first total-stock-information obtainment portion configured to obtain said own total-stock information stored in said IC circuit part.

5. The article management system according to claim 1, wherein: said IC circuit part of each of the plurality of RFID tag circuit elements stores neighbor target information corresponding to another RFID tag circuit element located in a neighborhood predetermined range; and said apparatus for communicating with an RFID tag includes a second tag-identification information obtainment portion configured to obtain said tag identification information of the RFID tag circuit element provided with said IC circuit part storing the neighbor target information using an inquiry signal including said neighbor target information.

6. The article management system according to claim 5, wherein: said IC circuit part of each of the plurality of RFID tag circuit elements stores neighbor arrival/shipping history information indicating arrival/shipping history of said article to be managed corresponding to said another RFID tag circuit element; and said apparatus for communicating with an RFID tag includes a second history-information obtainment portion configured to obtain said neighbor arrival/shipping history information stored in said IC circuit part.

7. The article management system according to claim 5, wherein: said IC circuit part of each of the plurality of RFID tag circuit elements stores neighbor-total-stock information indicating a total stock quantity of said article to be managed corresponding to said another RFID tag circuit element; and said apparatus for communicating with an RFID tag includes a second total-stock-information obtainment portion configured to obtain said neighbor-total-stock information stored in said IC circuit part.

8. The article management system according to claim 5, wherein: said IC circuit part of each of the plurality of RFID tag circuit elements stores neighbor-reservation information indicating presence/absence of reservation of use of said article to be managed corresponding to said another RFID tag circuit element; and said apparatus for communicating with an RFID tag includes a second reservation-information obtainment portion configured to obtain said neighbor-reservation information stored in said IC circuit part.

9. The article management system according to claim 5, wherein: said IC circuit part of each of the plurality of RFID tag circuit elements stores compatibility information of corresponding article to be managed with said article to be managed corresponding to said another RFID tag circuit element; and said apparatus for communicating with an RFID tag includes: a compatibility-information obtainment portion configured to obtain said compatibility information stored in said IC circuit part; and a compatibility-information display output portion configured to output a signal for displaying said compatibility information obtained by said compatibility-information obtainment portion to a display device.

* * * * *